(12) United States Patent
Willig et al.

(10) Patent No.: US 6,641,636 B2
(45) Date of Patent: Nov. 4, 2003

(54) FILTER STRUCTURE

(75) Inventors: Michael Willig, Ludwigsburg (DE); Stefan Rumpp, Nuertigen (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/886,405

(22) Filed: Jun. 22, 2001

(65) Prior Publication Data

US 2002/0017084 A1 Feb. 14, 2002

Related U.S. Application Data

(60) Provisional application No. 60/213,238, filed on Jun. 22, 2000.

(51) Int. Cl.$^7$ .............................................. B01D 45/00
(52) U.S. Cl. ......................... 55/385.3; 55/471; 55/490; 55/498; 55/507; 55/DIG. 28; 55/DIG. 30; 123/198 E; 180/84; 454/158
(58) Field of Search ................................ 55/385.3, 471, 55/482, 490.1, 498, 507, DIG. 28, DIG. 30; 123/198 E; 454/158; 180/84

(56) References Cited

U.S. PATENT DOCUMENTS

| 2,199,883 | A | * | 5/1940 | Ishiwata | 180/84 |
|---|---|---|---|---|---|
| 2,886,120 | A | * | 5/1959 | Broell | 180/84 |
| 3,776,358 | A | * | 12/1973 | Williams | 180/84 |
| 4,425,145 | A | * | 1/1984 | Reese | 55/385.3 |
| 4,490,881 | A | * | 1/1985 | Schmidt | 55/385.3 |
| 4,995,891 | A | | 2/1991 | Jaynes | |
| 5,810,896 | A | * | 9/1998 | Clemens | 55/385.3 |
| 5,865,863 | A | * | 2/1999 | DeSousa et al. | 55/385.3 |
| 5,882,608 | A | * | 3/1999 | Sanocki et al. | 55/DIG. 30 |
| 5,913,295 | A | * | 6/1999 | Sadr et al. | 123/198 E |
| 5,938,804 | A | * | 8/1999 | Engel et al. | 55/498 |
| 5,968,215 | A | | 10/1999 | Webb | |
| RE37,150 | E | * | 5/2001 | Anonychuk | 55/385.3 |
| 6,284,009 | B1 | * | 9/2001 | Marko et al. | 55/385.3 |
| 6,395,049 | B2 | * | 5/2002 | Knodler et al. | 55/385.3 |
| 6,422,197 | B1 | * | 7/2002 | Amann et al. | 55/385.3 |

FOREIGN PATENT DOCUMENTS

DE 762759 7/1954
DE 4326731 2/1995

* cited by examiner

Primary Examiner—Duane Smith
Assistant Examiner—Minh-Chau T. Pham
(74) Attorney, Agent, or Firm—Crowell & Moring LLP

(57) ABSTRACT

A filter unit for a motor vehicle which combines an intake air filter for an internal combustion engine and an interior ventilation air filter for a passenger compartment in a single unit. Filter housings for the respective filters may be joined to each other by a releasable connection, such as a combination of attachment hooks and screw fasteners, or they may be formed integrally with each other in one piece.

15 Claims, 4 Drawing Sheets

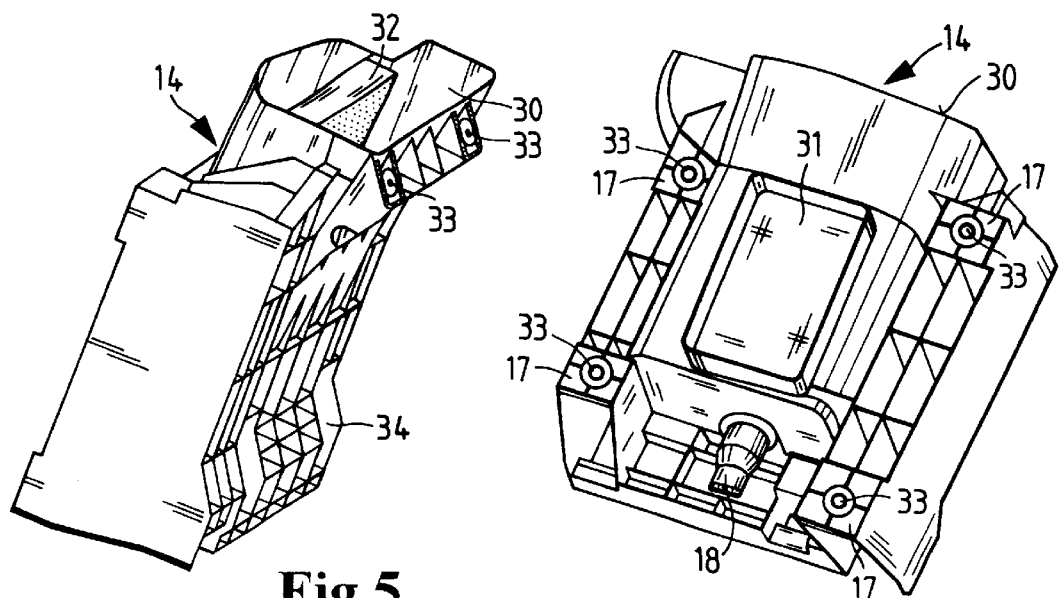
Fig.5
Fig.6
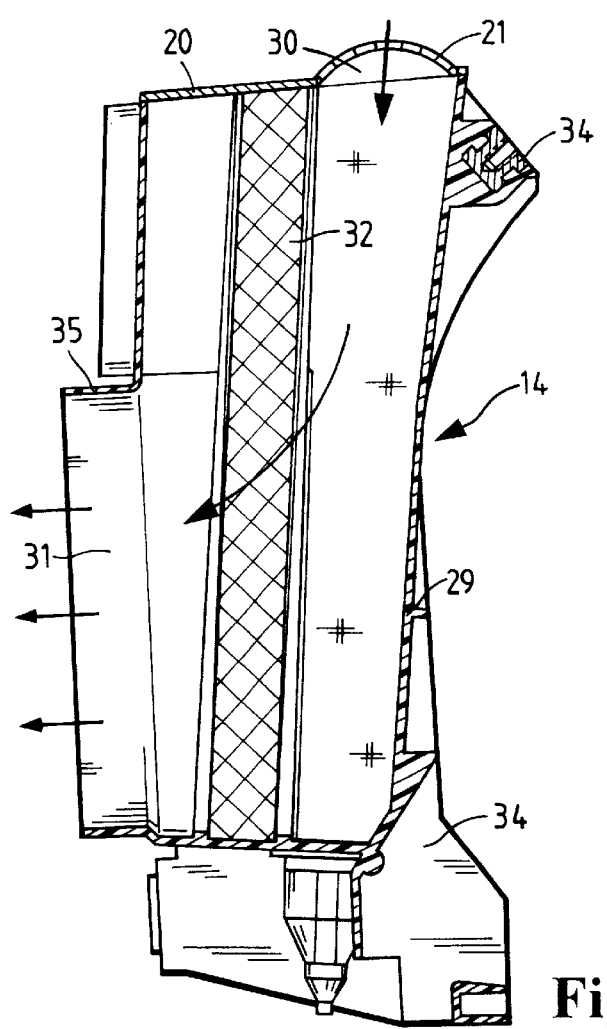
Fig.7

FILTER STRUCTURE

CROSS REFERENCE TO RELATED APPLICATIONS

This application claims priority from U.S. provisional patent application No. 60/213,238, filed Jun. 22, 2000, the entire disclosure of which is incorporated herein by reference.

SUMMARY OF THE INVENTION

The invention relates to a filter structure, which can especially be installed in the motor compartment of a motor vehicle.

According to the invention the housing structure of the motor air filter and of the interior space air filter of the motor vehicle are combined in a single unit. This configuration proves to be advantageous in the installation of the unit in the motor compartment. It can be preassembled complete prior to installation. However, it is also possible to assemble the parts successively in the motor compartment.

In general, component parts are few, and the component weight is reduced by saving material. At the same time the configured housing structures can be made more rigid in spite of the saving of material, since stabilization effects occur among the housing structures, and the housing structure can advantageously be made in one piece. The housing structures of the interior space and motor air filter may, however, also be made as separate housing structures which can be assembled together. Lastly, the component group also takes up less space in the motor compartment of the vehicle, so that the structure according to the invention can find room even where installation conditions are cramped.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which:

FIG. 5 shows a perspective detail view of the interior air filter of FIG. 1;

FIG. 6 shows another perspective view of the interior space air filter according to FIG. 5, and FIG. 7 shows a sectional view of the interior space air filter of FIG. 5.

DETAILED DESCRIPTION OF PREFERRED EMBODIMENTS

Figure 1:
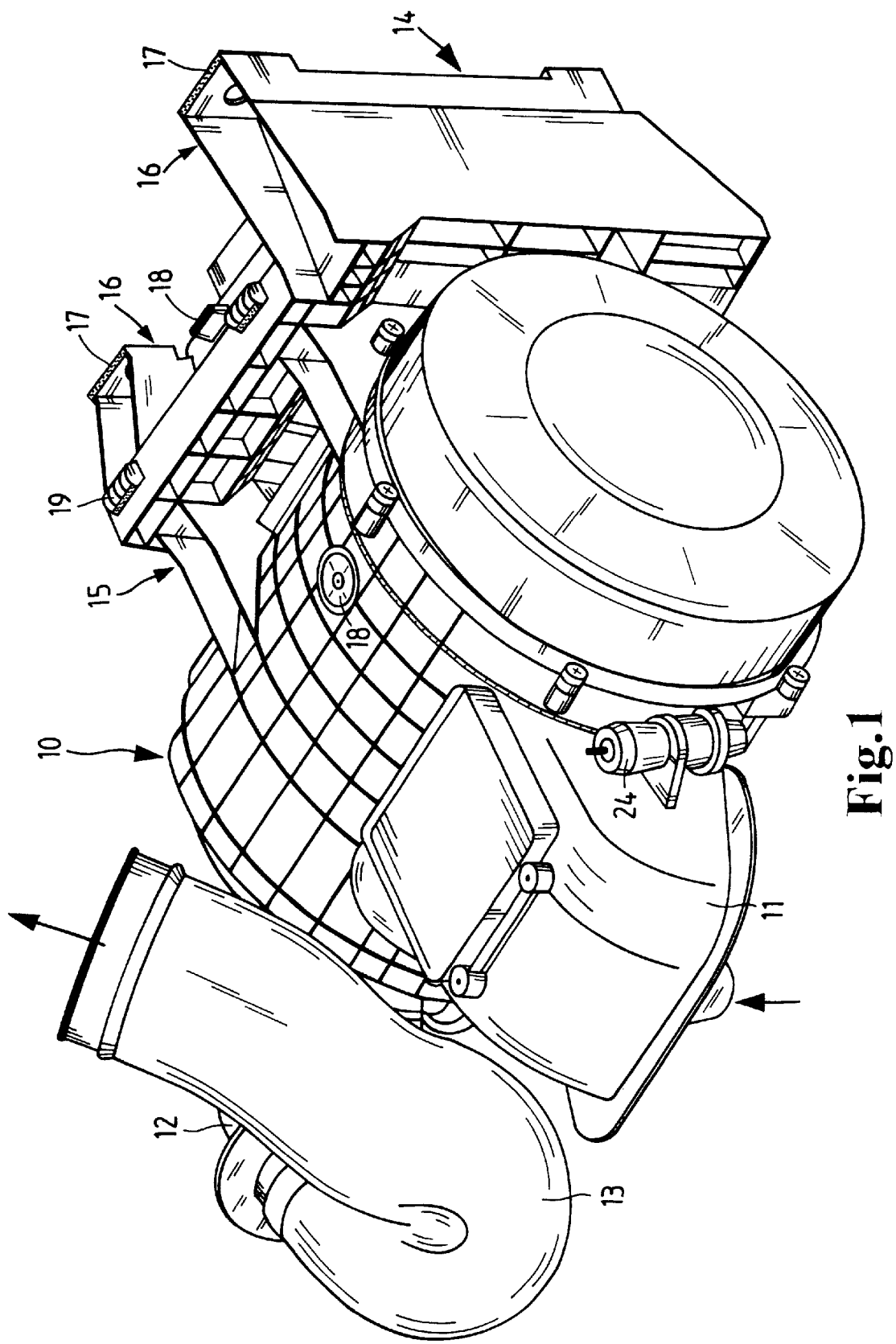
FIG. 1 shows a perspective view of a filter unit comprising an intake air filter and interior air filter.

FIG. 1 shows an air intake filter 10 which has an air inlet 11 and an air outlet 12 for the combustion air of an internal combustion engine (not shown). To the air outlet connection there is attached a hose 13 of elastomer which serves to carry the intake air to the internal combustion engine.

An interior space air filter 14 is also illustrated. The air intake filter and interior space air filter are combined in one unit by a releasable connection 15. The interior space air filter also has a mount 16 for installing the entire component in the motor compartment of a vehicle. In the illustrated embodiment, mount 16 takes the form of flanges 17 for screws (not shown).

The unit is shown in a view from underneath. Two connections 18 may be seen, which are suitable for draining any water which may accumulate in the housing structures. It may also be seen that the releasable connection 15 between the air intake filter 10 and the interior space air filter 14 is provided in the bottom area by attachment hooks 19.

Figure 2:
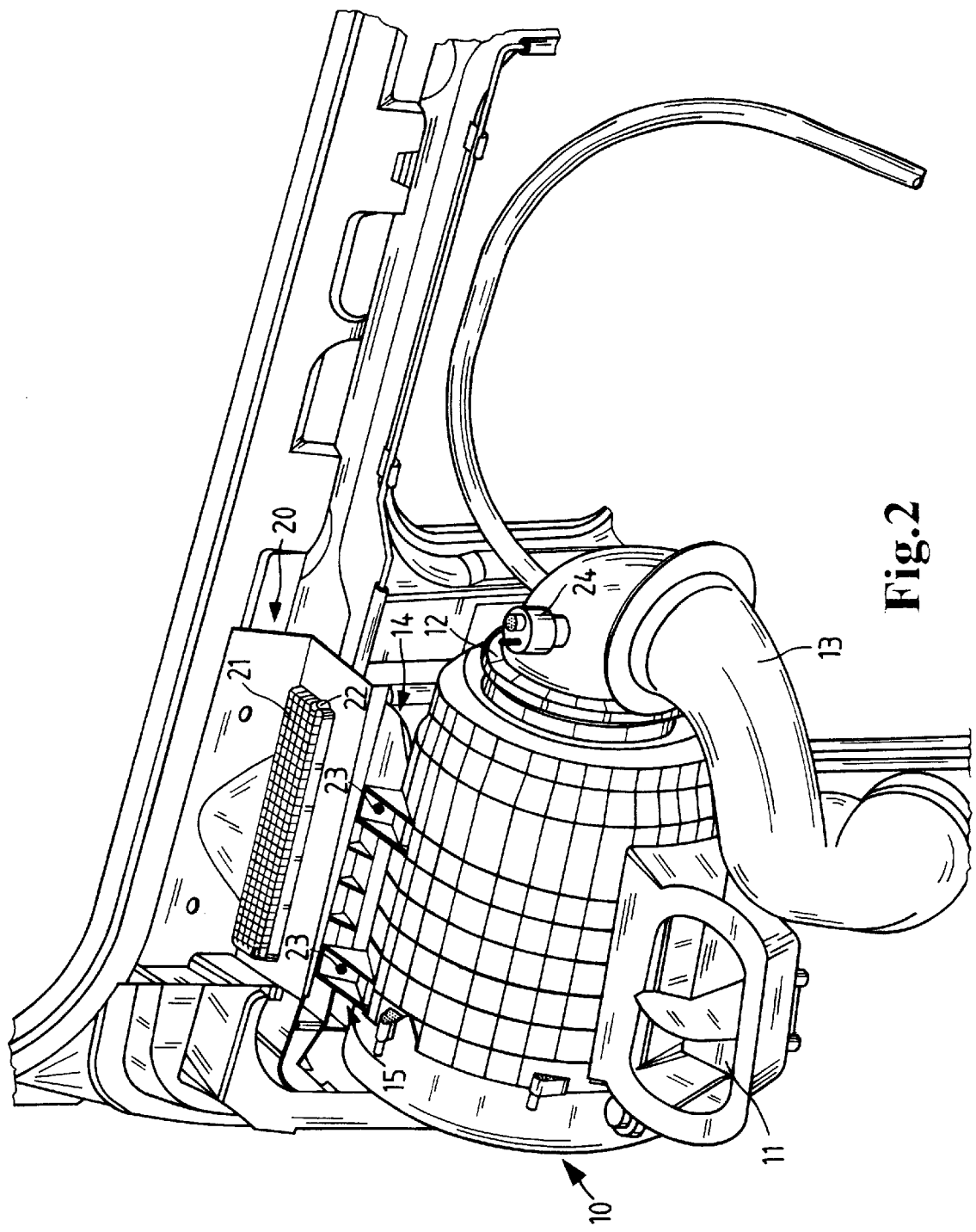
FIG. 2 shows a perspective view of the filter unit of FIG. 1 installed in a motor compartment in front of the windshield.

In FIG. 2 the entire unit is shown at the site of its installation. The installation site is the outer wall of the passenger compartment of a truck, directly under the windshield. Also to be seen is a cover 20 which serves to close off the interior space air filter 14 and simultaneously forms an interior air inlet 22 through a screen 21. Moreover the opposite side of the releasable connection 15 can be seen, which is in the form of a screw attachment 23.

The components already described in FIG. 1 are identified by the same reference numbers and are not further explained here. Additional components, such as a sensor 24, can be provided on both air filters.

Figure 3:
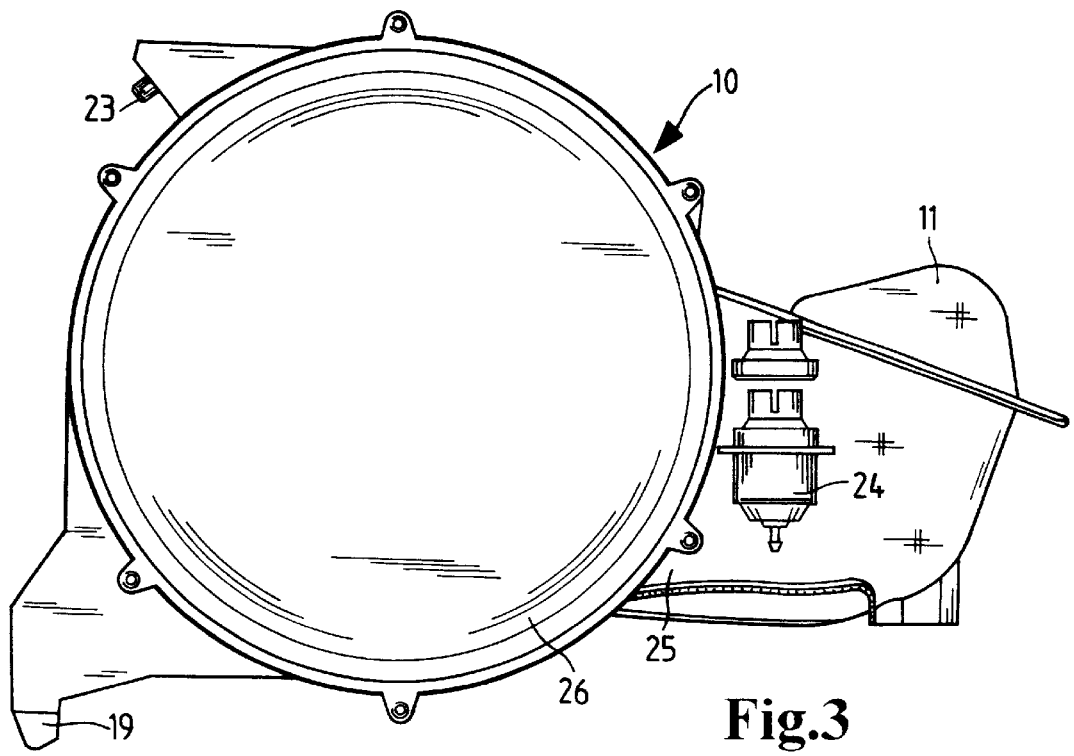
FIG. 3 shows a plan view of the air intake filter of FIG. 1.
Figure 4:
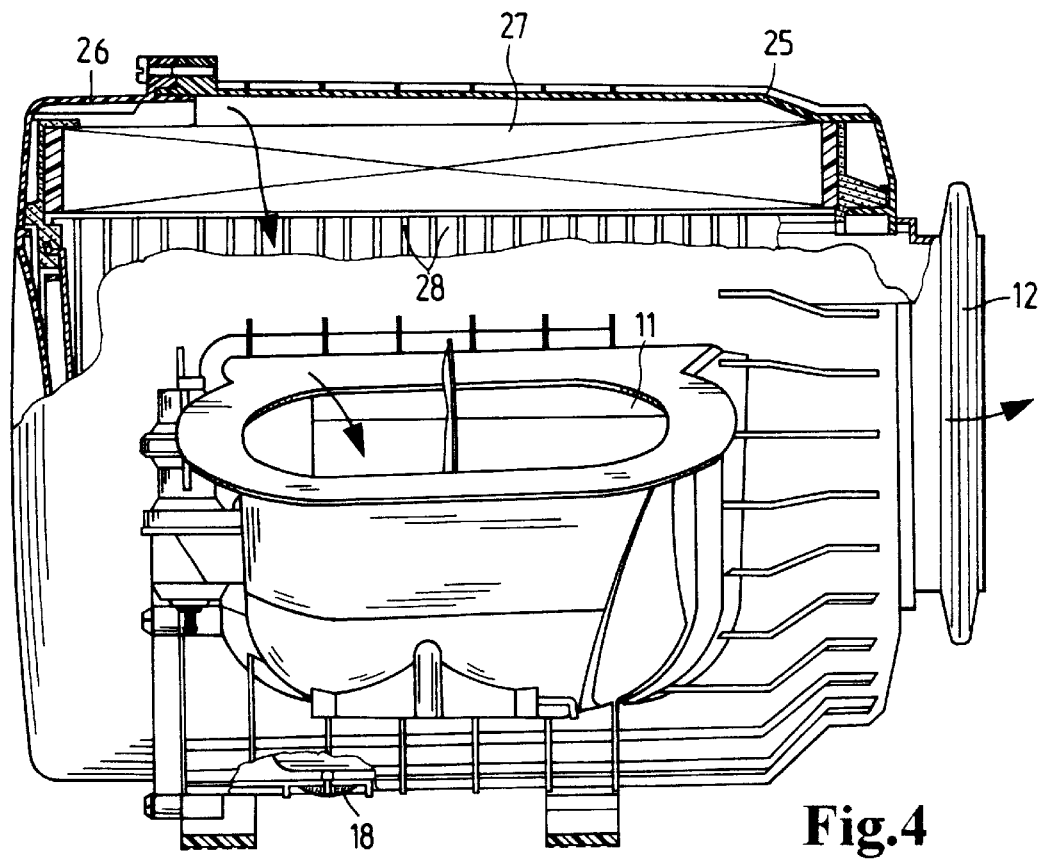
FIG. 4 shows a partially cut-away side view of the air intake filter of FIG. 3.

FIGS. 3 and 4 show the air intake filter 10 more precisely. This filter forms for the unit a first housing structure 25 with a housing cover 26. The housing structure 25 can be attached together with the interior space air filter 14 (not shown) by the attachment hooks 19 and screw attachments 23 in the manner described above to form the unit.

In the cut-away drawing it can be seen that the first housing structure 25 closed by the housing cover 26 encloses a first filter element 27, which is provided with a supporting tube 28. Also, the connection or plug 18 for water drainage can be seen.

FIGS. 5 and 6 illustrate the second housing structure 29 which forms the interior space air filter 14. This housing structure also has an interior air inlet 30 and an interior air outlet 31. Inside the housing there is a second filter element 32 which serves to filter the interior ventilation air for the passenger compartment of the truck.

The flanges 17 also contain resilient elastic elements 33 constituting a mechanical uncoupling or isolator. The interior space air filter is suspended on this mechanical isolator in the motor compartment of the truck, creating a vibration insulator. Furthermore, recesses 34 are provided for the attachment hooks 19 and the screw attachments 23 of the intake air filter (not shown). These form the junctions which serve to combine the intake air filter 10 and the interior space air filter 14 in a single unit. Lastly, the connection or plug 18 for the water drainage can be seen.

FIG. 7 depicts a sectional view of the interior space air filter. The cover 20 can still be seen, which covers the interior air inlet 30 with the screen 21. The air flow is indicated by arrows the same as in FIG. 4. The interior air outlet 31 simultaneously forms a short duct section 35 which leads directly to a connection to the interior ventilation system of the passenger compartment (cf. FIG. 2). This is likewise integrated into the unit.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. An air intake filter for an internal combustion engine, comprising a first housing structure in which a first filter element is disposed between an intake air inlet and an intake air outlet, and a second housing structure in which a second filter element is disposed between a ventilating air inlet and a ventilating air outlet, wherein said first housing structure and said second housing structure are joined together to form a single filter unit, and wherein a duct section is integrated into at least one of said first and second housing structures for carrying an intake air flow to the internal combustion engine or a ventilation air flow to the passenger compartment.

2. An air intake filter according to claim 1, wherein the first housing structure and the second housing structure comprise a common component which forms part of both housing structures.

3. An air intake filter according to claim 1, wherein the first housing structure and said second housing structure are joined to each other by a releasable connection.

4. An air intake filter according to claim 3, wherein the releasable connection is effected by a combination of at least one attachment hook and at least one fastening screw.

5. An air intake filter according to claim 3, wherein only one of said first and second housing structures is provided with a mounting member for installing the filter unit at an installation site.

6. An air intake filter according to claim 5, wherein the mounting member comprises a mounting flange, and the installation site is an engine compartment of a motor vehicle.

7. An air intake filter according to claim 5, wherein the interior ventilation air filter includes the mounting member for installing the filter unit at an installation site in an engine compartment and at least one fastener for releasably connecting the interior ventilation air filter to the intake air filter.

8. An air intake filter according to claim 1, wherein the filter unit is installed at an installation site via a mechanical isolator which insulates the filter from mechanical vibrations.

9. An air intake filter according to claim 1, wherein at least one of said first and second housing structures is provided with a connection for discharging accumulations of water from the housing structure.

10. An air intake filter according to claim 1, wherein said duct section comprises an interior ventilation air supply duct for a passenger compartment of the motor vehicle.

11. An air intake filter for an internal combustion engine, comprising a first housing structure in which a first filter element is disposed between an intake air inlet and an intake air outlet, and a second housing structure in which a second filter element is disposed between a ventilating air inlet and a ventilating air outlet, wherein said first housing structure and said second housing structure are joined together to form a single filter unit; wherein the first housing structure defines a first flow path between the intake air inlet and the intake air outlet, and the first filter element is disposed in the first flow path; wherein the second housing structure defines a second flow path between the ventilating air inlet and the ventilating air outlet, and the second filter element is disposed in the second flow path; wherein the first and second flow paths are separate from each other, whereby air flowing through the first flow path does not flow through the second flow path; and wherein the first flow path supplies air to the internal combustion engine for combustion, and wherein the second flow path supplies air to a passenger compartment.

12. A method of installing a filter unit that includes a first housing structure in which a first filter element is disposed between an intake air inlet and an intake air outlet, and a second housing structure in which a second filter element is disposed between a ventilating air inlet and a ventilating air outlet, wherein said first housing structure and said second housing structure are joined, the method comprising:

connecting the intake air outlet to an engine of a motor vehicle so that combustion air can flow into the first housing structure through the intake air inlet, flow through the first filter element, and flow through the intake air outlet to the engine; and connecting the ventilating air outlet to an interior space of the motor vehicle so that ventilating air can flow into the second housing structure through the ventilating air inlet, flow through the second filter element, and flow through the ventilating air outlet to the interior space.

13. The method according to claim 12, further comprising connecting the intake air inlet to a combustion air inlet so that the combustion air can flow from the combustion air inlet to the intake air inlet.

14. A method of installing a filter unit that includes a first housing structure in which a first filter element is disposed between an intake air inlet and an intake air outlet, and a second housing structure in which a second filter element is disposed between a ventilating air inlet and a ventilating air outlet, the method comprising:

connecting the intake air outlet to an engine of a motor vehicle so that combustion air can flow into the first housing structure through the intake air inlet, flow through the first filter element, and flow through the intake air outlet to the engine;

connecting the ventilating air outlet to an interior space of the motor vehicle so that ventilating air can flow into the second housing structure through the ventilating air inlet, flow through the second filter element, and flow through the ventilating air outlet to the interior space; and joining the first housing structure with the second housing structure.

15. The method according to claim 14, further comprising connecting the intake air inlet to a combustion air inlet so that the combustion air can flow from the combustion air inlet to the intake air inlet.

* * * * *